United States Patent [19]
Bauer

[11] 3,977,258
[45] Aug. 31, 1976

[54] TRAVERSE MECHANISM

[76] Inventor: Gordon L. Bauer, c/o Wyrepak Industries, Inc., 136 James St., Bridgeport, Conn. 06604

[22] Filed: Jan. 27, 1975

[21] Appl. No.: 544,598

Related U.S. Application Data

[63] Continuation of Ser. No. 420,217, Nov. 29, 1973, abandoned.

[52] U.S. Cl. .................................................. 74/25
[51] Int. Cl.² ........................................ F16H 21/16
[58] Field of Search .................................... 74/25

[56] References Cited
UNITED STATES PATENTS
2,940,322   6/1960   Uhing .................................... 74/25

*Primary Examiner*—Samuel Scott
*Assistant Examiner*—Wesley S. Ratliff, Jr.
*Attorney, Agent, or Firm*—H. Gibner Lehmann; K. Gibner Lehmann

[57] ABSTRACT

An automatically reversing traverse mechanism cooperable with a rotating shaft, comprising a base, a roller mounted on the base for simultaneous turning and swiveling movement, and engageable with the shaft, and a unique yieldable biasing means which urges the roller by means of a snap movement to either of two oppositely disposed, extreme angular positions. As the shaft is rotated, the angularly disposed roller and base automatically undergo reciprocative movements in a path parallel to the axis of the shaft. The traverse mechanism includes a novel operating means which substantially instantaneously swivels the roller from its one extreme position to its other extreme position in response to movement of the base past a predetermined point. The operating means includes a fixed abutment located at a predetermined point along the shaft, and an arm rotatably carried by the base, which engages the abutment and subsequently undergoes turning movement. This turning movement is made to effect a substantially instantaneous turning movement of a second arm on which the roller is carried, thus accomplishing the swiveling of the latter from one extreme position to another. Due to the snap action which swivels the roller, the rate of traversal axially along the shaft is very constant and does not suffer from a reduction in speed immediately before the reversal in direction of the base. An additional abutment is disposed opposite to and acts like the first, thereby to enable the mechanism to undergo reciprocating movement. Means are also provided for counting the number of traversals and for automatically shifting the two abutments after a predetermined count, thus enabling the length of the reciprocating stroke to be varied in accordance with a predetermined pattern.

23 Claims, 13 Drawing Figures

TRAVERSE MECHANISM

This application is a continuation of my copending application Ser. No. 420,217 filed Nov. 29, 1973 and entitled "Traverse Mechanism", now abandoned.

BACKGROUND

In the past a number of reversing traverse mechanisms have been proposed and constructed. In a common friction type device, one or more roller elements were swivel-mounted on a base member which moved along a rotating shaft at a given speed, depending on the rate of shaft rotation and the angle at which the roller means was disposed with respect to the shaft. Frequently, several rollers were used to engage the shaft in order to minimize slippage and increase efficiency. In case where more than one roller was employed, they were usually connected by means of gears or linkages to enable all of them to be swiveled simultaneously in response to swiveling of any given one. A reversal in the direction of travel of the mechanism was effected by engagement of a swivel arm connected to one roller with a fixed abutment located at a predetermined point along the shaft. However, there were distinct disadvantages to this construction, in that as the swivel arm was turned, the relative angle between the rollers and the shaft slowly decreased which resulted in a slow-down of the traversing movement of the mechanism immediately before reversal. Under some circumstances there was a distinct possibility that as the rollers were swiveled they could, at some point during a reversal, assume a "dead" position wherein their axes of rotation would be parallel to the shaft axis. Under such a condition the traversing movement would cease and the rollers would have to be manually swiveled to initiate further traversing movement.

SUMMARY

The above drawbacks and disadvantages of prior traverse devices are obviated by the present invention, which has for an object the provision of an improved reversing traverse mechanism which is especially simple in its construction, reliable in operation and which more importantly can maintain a substantially constant rate of traversal throughout its entire path of travel, including the points at which the reversal occurs. A related object of the invention is the provision of a novel mechanism as above set forth, which can experience reciprocating movement between progressively advanced predetermined points along its path of travel, both in opposite directions and at essentially the same constant speed. Another related object is the provision of an improved counting and control device connected with the traverse mechanism to receive therefrom information relating to the number of reversals made, and to automatically position adjustable abutment members along the path of travel in response to said information, thereby to define the progressive end limits at which reverse movement occurs.

The above objects are accomplished by a unique friction-type traverse mechanism cooperable with a rotating shaft having a smooth cylindrical surface, said mechanism comprising a base, a roller mounted on the base for simultaneous swiveling and turning movement and engageable with the surface of the rotating shaft, and an operating means for effecting a snap-type or substantially instantaneous swiveling movement of the roller from one of its extreme positions to the other. The operating means comprises an arm rotatably mounted on the base and engageable with either of two abutments disposed along the length of the shaft at predetermined points. Upon its engagement with one abutment, the arm is cause to pivot, which in turn operates another arm directly carrying the roller, such that the latter undergoes a sudden swiveling movement from one extreme position to an opposite extreme position. The other abutment, which is displaced from the first, operates in a similar manner and enables the traverse mechanism to reciprocate along the shaft between the predetermined end limit positions. Counter and control means connected with the traverse mechanism provide for automatic positioning of the abutments, thus enabling the length of the reciprocating stroke to be varied after predetermined numbers of reversals of the mechanism have occurred.

Other features and advantages will hereinafter appear.

In the drawings, illustrating several embodiments of the invention.

Figure 1:
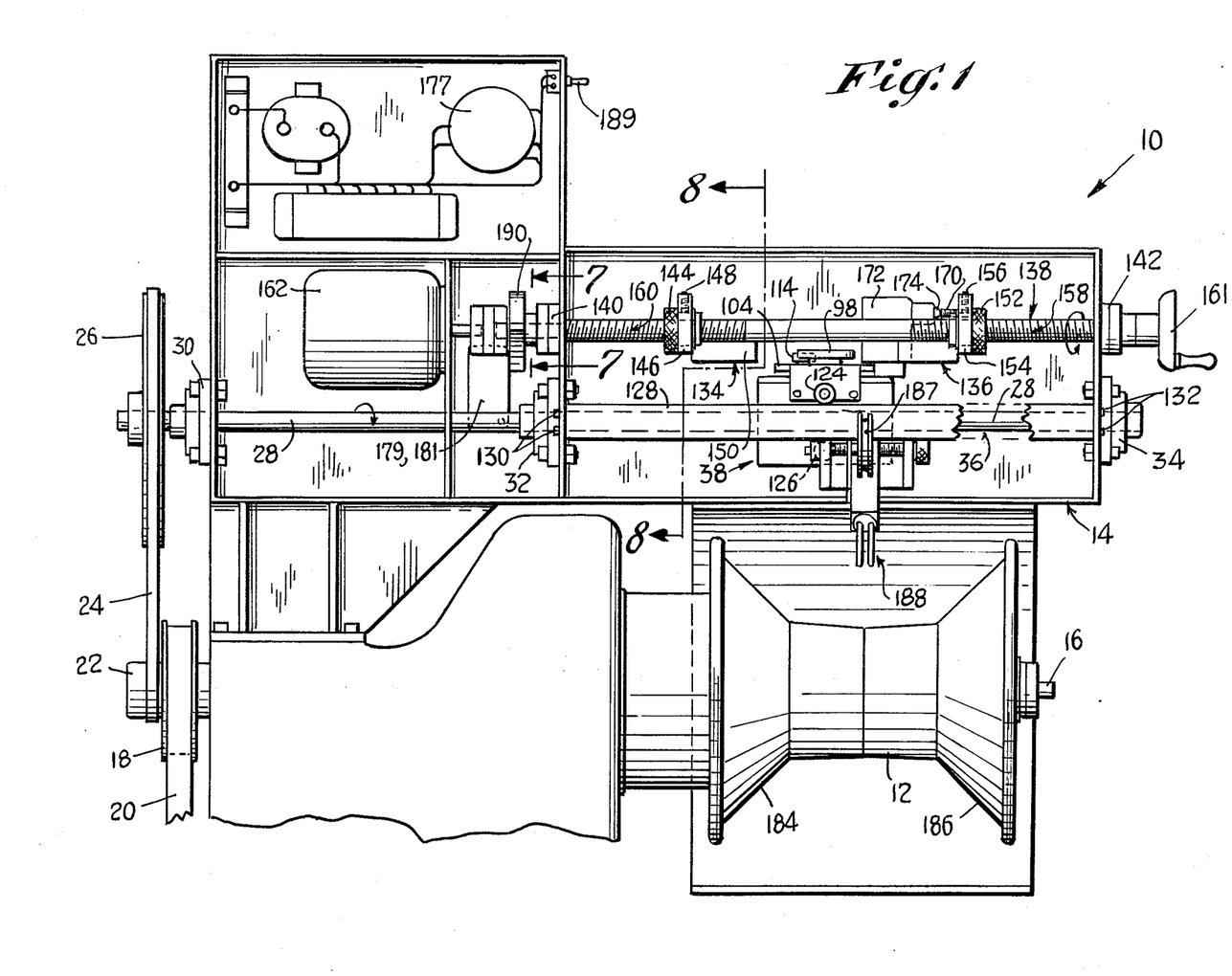
FIG. 1 is a front elevational view of an automatic spooling device incorporating one form of the reversing traverse mechanism of the present invention.
Figure 2:
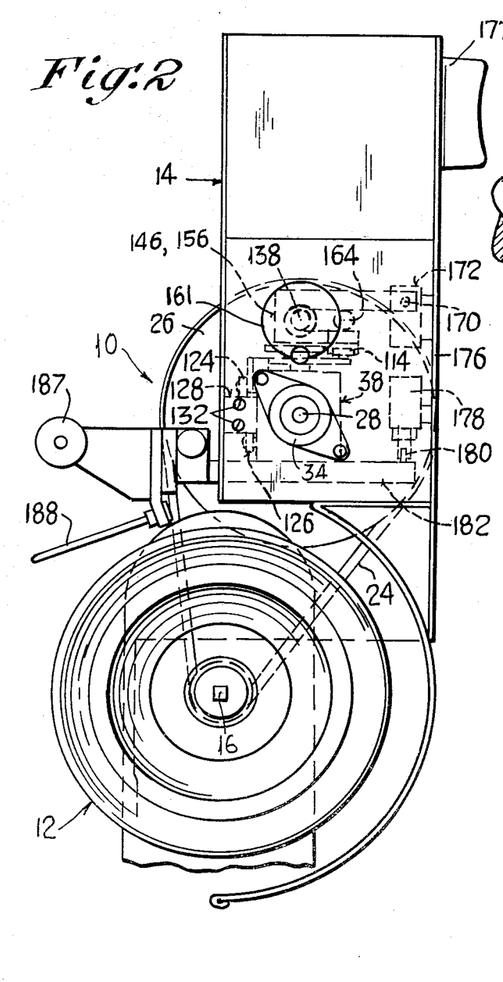
FIG. 2 is a right side elevation of the spooling device of FIG. 1.

Referring first to FIG. 1 there is illustrated a spooling device generally designated by the numeral 10, for transferring wire from a master or supply spool (not shown) to a take-up spool 12. The spooling device 10 includes a machine frame 14 having a shaft 16 rotatably carried thereon and mounting the spool 12. The shaft 16 is keyed to the spool 12 to enable the latter to be rotatably driven. A pulley 18 carried on the shaft 16, and a drive belt 20 provide drive power from a motor (not shown). An additional pulley 22 and belt 24 provide driving torque for a third pulley 26 which is carried on a traverse shaft 28 as illustrated in FIG. 1. The traverse shaft 28 is rotatably mounted on the frame 14 by bearings 30, 32 and 34.

Figure 5:
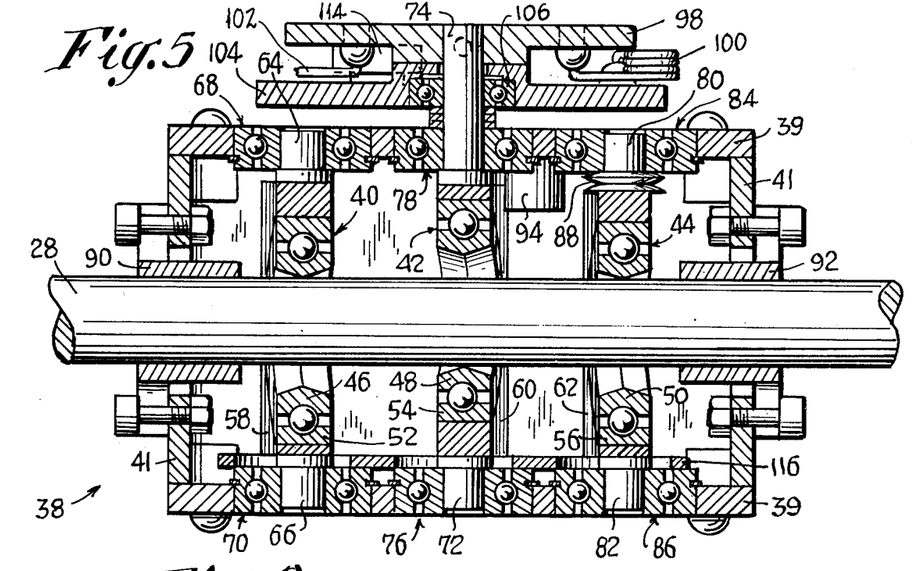
FIG. 5 is a vertical section of the traverse mechanism of FIG. 3.
Figure 6:
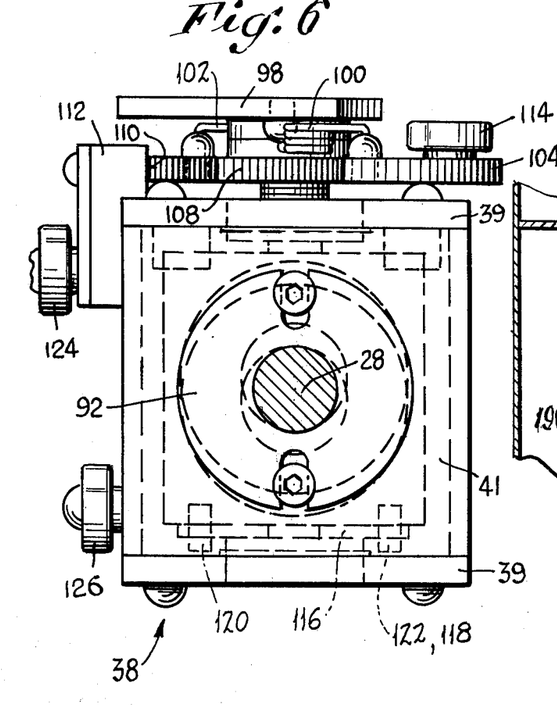
FIG. 6 is a right end elevation of the traverse mechanism of FIG. 3.

In accordance with the present invention there is provided a novel traverse mechanism 38 for engagement with the shaft 28, said mechanism being adapted for traversing and reciprocating movement in a path having a direction parallel to the shaft axis. Referring to FIG. 5, the traverse mechanism 38 comprises bases 39, a housing 41 and rollers 40, 42 and 44. The rollers 40–44 comprise annular bearing assemblages having inner races 46, 48 and 50 respectively, and outer races 52, 54 and 56 respectively, said assemblages being disposed within the housing 41. As illustrated, the inner races 46–50 have a substantially larger diameter than that of the shaft 28, and engage the latter along limited peripheral areas. The rollers 40–44 are carried on mounting blocks 58, 60 and 62 respectively, which are swivel mounted on the bases 39. The block 58 is provided at its end with mounting shafts 64 and 66 which engage ball bearings 68 and 70, respectively. In a similar manner the block 60 is rotatably carried on the bases 39 by means of shafts 72 and 74, the latter extending through a wall of one base; the shafts 72 and 74 are carried by ball bearings 76 and 78, respectively. Similarly the block 62 is mounted on shafts 80, 82 engaging ball bearings 84, 86, respectively.

There is further provided spring means 88 comprising back-to-back washers for biasing the roller assemblage 44 into engagement with the shaft 28. It is to be noted that the housing 41 carries bearings 90 and 92, which are of the slide type and permit a limited self-alignment of the traverse mechanism 38 with respect to the shaft 28. The self alignment of the traverse mechanism is effected by the spring 88 which biases the roller or bearing assemblage 44 into engagement with the shaft 28. This arrangement also tends to maintain the remaining two rollers 40 and 42 in continuous engagement with the shaft.

Figure 3:
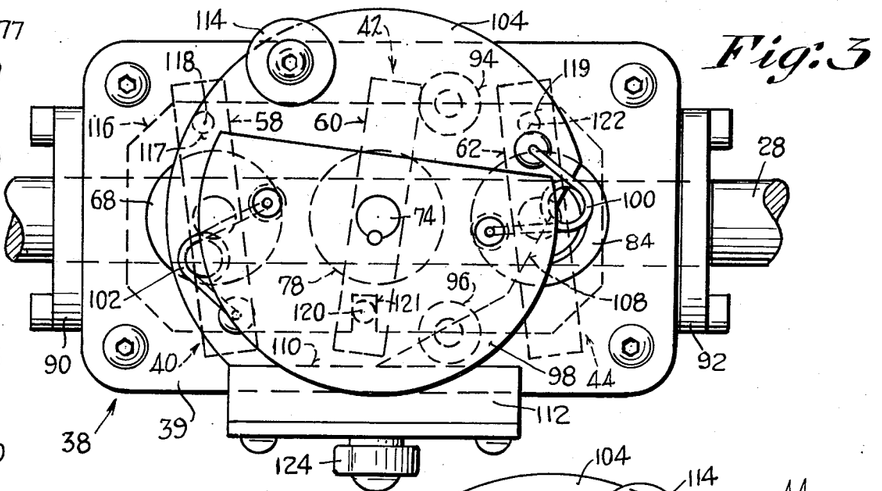
FIG. 3 is a top plan view of a traverse mechanism constituting one embodiment of the invention, particularly illustrating a roller assemblage which is swiveled to one extreme position, and further illustrating the operating means for snapping or instantaneously swiveling the roller from one of its extreme positions to the other.
Figure 4:
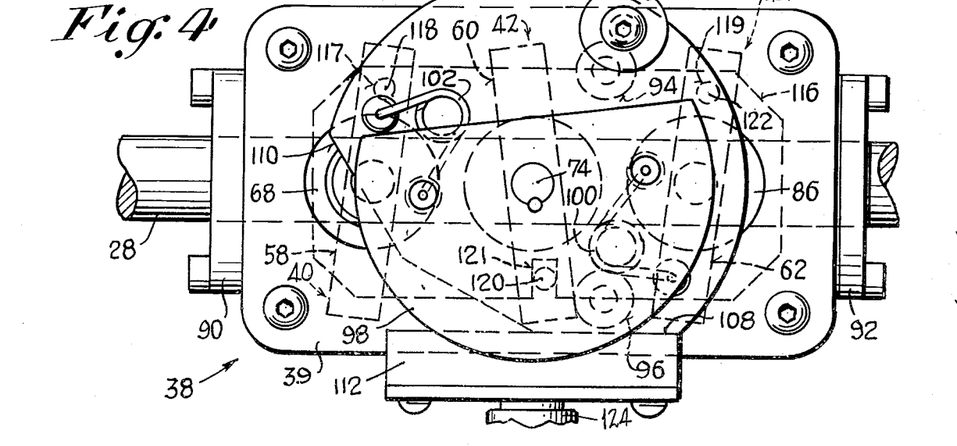
FIG. 4 is a view like that of FIG. 3, but showing the roller swiveled to the other of its extreme positions by the operating means.

Referring now to FIGS. 3–5, in accordance with the present invention there is further provided a yieldable biasing means urging the bearing assemblage 42 to either one of two oppositely disposed extreme positions and adapted to snap the assemblage to one position or the other. The extreme positions are determined by engagement of the roller block 60 with either of two fixed abutments 94, 96 rigidly carried on one base, these being illustrated in dotted lines in FIGS. 3 and 4. FIGS. 3 and 5 show the bearing assemblage 42 in its one extreme position wherein it engages the abutment 94. FIG. 4 shows the assemblage 42 in its other extreme position wherein it engages the other abutment 96. The yieldable biasing means acting on the assemblage 42 comprises an arm 98 rigidly carried on the shaft 74, and a pair of torsion coil springs 100, 102, each having one end pivotally connected to the arm. The free ends of the torsion springs are connected to a reversing member, shown here as a second arm or reversing member 104 carried on a bearing 106 (see FIG. 5) on the shaft 74. The arm 104 is not rigid with respect to the shaft 74, but instead can undergo limited turning movement thereon with respect thereto, as will be explained below.

It can be understood that the arm 98 is rigid with respect to the bearing assemblage 42, and both can undergo limited rotation or swiveling movement between the two extreme positions illustrated respectively in FIGS. 3 and 4. The second arm 104 can also undergo limited rotation between two extreme positions as illustrated respectively in FIGS. 3 and 4, the extreme positions being defined by the engagement of the flatted portions 108 and 110 on the arm 104 with a stop plate 112 carried on the base 39. The torsion springs are so arranged that when the angle between their ends is less than 90°, the force exerted by the springs tends to increase the angle up to the point of 90°. By this arrangement it will be understood that in FIG. 3 the arm 104 and the arm 98 are spring urged on opposite sides of a dead center, to their opposite rotative positions wherein the flatted portion 110 of the arm 104 engages the plate 112 and the arm 98 urges the bearing assemblage 42 into engagement with the abutment 94. The arm 104 is provided with an actuator roller 114 by which turning of the arm 104 can be effected when the roller 114 is engaged by a suitable abutment means.

An instantaneous or snap swiveling of the arm 98 and bearing assemblage 42 to the position of FIG. 4 is readily effected by shifting of the roller 114 in FIG. 3 toward the right. As this is done, the bearing assemblage 42 is at first urged into even tighter engagement with the abutment 94. However, past the dead center point where the springs reach their maximum torsion, further shifting of the arm 104 will cause the arm 98 to substantially instantaneously shift (counterclockwise in FIGS. 3 and 4) to the position illustrated in FIG. 4 wherein the bearing assemblage 42 engages the abutment 96. Also, the arm 104 will now become biased to the extreme (clockwise) position illustrated in FIG. 4 by the action of the torsion springs 100, 102, wherein the flat portion 108 engages the plate 112. The arm 104 will remain in this position until actuated again.

In a similar manner, the bearing assemblage 42 can be instantaneously shifted from the position of FIG. 4 to that of FIG. 3 by shifting the roller 114 in FIG. 4 toward the left. It will be understood that such an arrangement provides a snap action swiveling of the bearing assemblage even when the arm 104 is actuated relatively slowly.

Referring to FIGS. 3–5, it can be seen that simultaneous swiveling of all the rollers is effected by means of a linkage interconnecting the same, comprising a slide plate 116 having apertures 117 and 119 and a slot 121, adapted to respectively receive upstanding pins 118, 122 and 120 carried by the bearing assemblages 40, 44 and 42 (respectively). The slot 121 enables the slide plate to undergo limited movement in its own plane in a direction perpendicular to the path of travel of the traverse mechanism, as necessitated by the swiveling of the bearing assemblages 40 and 44.

It is noted that the bearing assemblages 40 and 44 swivel in the same direction while the assemblage 42 swivels in an opposite direction, due to the fact that the inner races 46 and 50 of assemblages 40 and 44 respectively engage the shaft along a line substantially diametrically opposite to the point of engagement by the race 48 of the assemblage 42. By this arrangement the radial force of the asemblages 40 and 44 on the shaft 28 is opposed by the oppositely directed radial force of the assemblage 42 acting on the opposite side of the shaft. Thus, for a given shaft rotation the three rollers tend to aid one another and to drive the traverse mechanism in the same axial direction.

FIGS. 1, 2, 7 and 8 illustrate details of the construction and operation of the spooling device employing the traverse mechanism of the present invention. In FIG. 1 the traverse mechanism 38 is shown engaging the smooth cylindrical surface 36 of the shaft 28. A pair of roller bearings 124 and 126 carried on the mechanism engage a guide rail 128 extending along the full length of the path travelled by the traverse mechanism. The rail 128 is fastened to the frame 14 by screws 130, 132 as illustrated in FIG. 1, and provides support for the traverse mechanism, preventing it from turning with the shaft 28 as the latter rotates.

Figure 8:
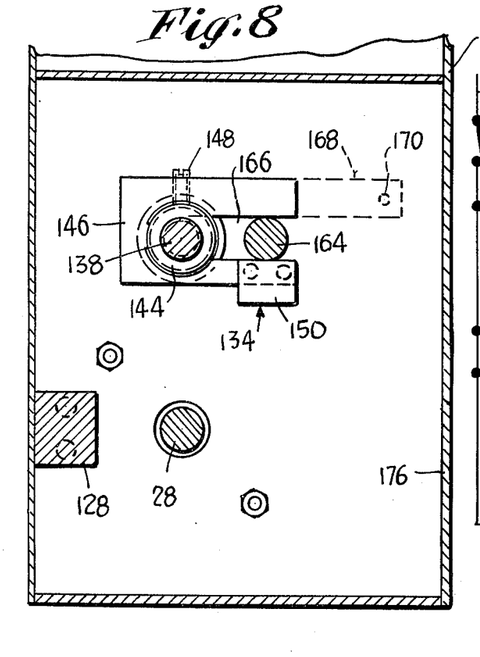
FIG. 8 is a section taken on line 8—8 of FIG. 1.

It can be readily seen that the traverse mechanism 38 will undergo axial movement toward the left in FIG. 1 for the position of the actuator roller 114 shown, and with the shaft 28 rotating in the direction indicated. As provided by the invention, two stationary but adjustable abutments 134, 136 are mounted along the path of travel of the traverse mechanism, being cooperable with the arm 104 (through roller 114) for automatically actuating the latter and shifting the arm 98 in response to traversing movement of the bases 39 along the shaft 28. This in turn swivels all three bearing assemblages 40, 42 and 44 to their respective opposite extreme positions. The abutments 134, 136 are carried on a threaded shaft 138 which is rotatably mounted on the frame 14 by bearings 140 and 142. The abutment 134 is illustrated in FIGS. 1 and 8 and comprises a nut 144 and a bushing 146 secured to the nut by a set screw 148. The abutment 134 further includes a stop portion 150 which is adapted to engage the roller 114 of the arm 104 and to effect rotary shifting of the latter in response to traversing movement of the bases 39 along the shaft 28. As the traverse mechanism 38 in FIG. 1 moves toward the left, the roller 114 will become engaged by the stop portion 150. Further movement toward the left will cause the arm 104 to be turnably shifted, which in turn will give rise to a snap movement or substantially instantaneous swiveling of the bearing assemblages 40, 42 and 44 as explained above, thus effecting the reversal of the direction of travel of the mechanism. Similarly, the abutment 136 comprises a nut 152 and a bushing 154 secured thereto by a set screw 156. The abutment 136 further comprises a stop portion similar to the portion 150 of the abutment 134, which is adapted to engage and shift the roller 114 of the traverse mechanism 38 as it travels toward the right in FIG. 1, thus effecting an opposite or second automatic reversal of the direction of travel of the mechanism along the shaft 28. Thus, the traverse mechanism is capable of reciprocating movement in a straight path between limits as determined by the positions of the abutments 134 and 136.

Further, in accordance with the present invention, the positions of the abutments 134 and 136 are adjustable. The threaded shaft 138 is provided with a left-hand threaded portion 158 and a right-hand threaded portion 160 whereby the shaft and nuts 144, 152 constitute interconnecting means for simultaneously moving the abutments in opposite directions either toward each other or away from one another. The nuts 152 and 144 are respectively left and right-handed. As illustrated in FIG. 1 the shaft 138 can be manually rotated in either direction by means of a crank handle 161 constituting a manually operable means for adjusting the abutments to different positions; or else it can be rotated by means of a small motor 162 which can be of the d.c. permanent-magnet type (constituting an electrically powered means connected with the interconnecting means for actuating the latter.) Rotation of the shaft 138 in a given direction will cause the abutments 134, 136 either to approach one another or to move away from one another, due to the opposite sense of the threaded portions 158 and 160. During the shifting of the abutments they are prevented from rotating by a guide shaft 164 (FIG. 8) which is slidably received in the slot 166 of the bushing 146 and in a corresponding slot of the bushing 154.

As best illustrated in FIGS. 1 and 8, the abutment 136 is provided with a switch-engaging portion 168 (shown dotted in FIG. 8) having a tapped hole and a set screw adjustment 170. A limit switch 172 (FIG. 2) is mounted on the rear wall 176 of the frame 14. The limit switch 172 has an actuator button 174 which is engageable by the set screw 170 as the abutment 136 is manually shifted toward the left in FIG. 1. The switch 172 is connected to the motor 162 to momentarily actuate the latter when the abutment has reached a predetermined or "start" position. By this arrangement the operator can manually set the abutments at the same starting position for beginning new take-up spools. The motor 162 momentarily runs and rotates the shaft 138 a fractional turn in a direction so as to disengage the set screw 170 and actuator button 174, at which time the motor then ceases to run. This establishes the predetermined position of the abutments 134 and 136. Adjustment of this starting position can be effected by adjustment of the set screw 170, as will be understood.

In accordance with the present invention there is provided a counter device 177 for tallying the number of reciprocations of the traverse mechanism. The counter is connected to the motor 162 in such a manner as to actuate the latter for a fraction of a turn (typically 180°) after a predetermined number of reciprocations has been counted. In accomplishing this, an additional switch 178 (FIG. 2.) is mounted on the rear wall 176 of the frame 14 and is provided with an actuator button or roller 180. Rigidly mounted on the traverse mechanism 38 is a plate 182 (FIG. 2) adapted to actuate the switch 178 each time the traverse mechanism reciprocates.

Figure 9:
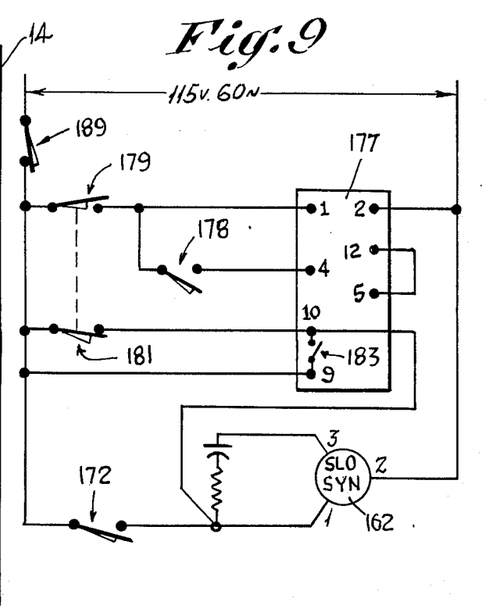
FIG. 9 is a schematic circuit diagram of the counter and control apparatus employed in conjunction with the traverse mechanism.

FIG. 9 illustrates schematically the counter device 177, motor 162 and switches 172, 178 as well as ganged switches 179, 181 to be discussed below. The switch 178 is connected with the counter 177 which tallies the reciprocations of the traverse mechanism and compares the number with a predetermined number which has been pre-set within the counter by the operator. When the counter has reached the predetermined count, the motor 162 advances the shaft 138 a fixed amount (one-half turn). This in turn effects a slight separation of the abutments 134 and 136 and hence increases the length of the reciprocating stroke of the traverse mechanism, at proper intervals of the spooling process.

The necessity for increasing the stroke is readily apparent from FIG. 1. The take-up spool 12 has conical end surfaces 184 and 186. Wire from a master spool (not shown) is fed over a roller 187 and through wire guides 188 to the take-up spool. The first few layers of wire are wound upon the cylindrical center portion of the spool. Successive layers must be wider in order to occupy the additional area created by the conical end surfaces 184 and 186. By arranging the counter to count the reciprocations and in turn actuate the motor 162 periodically, the increased stroke is automatically effected. Once this is begun the entire spool can be filled automatically without the aid of an operator.

Figure 7:
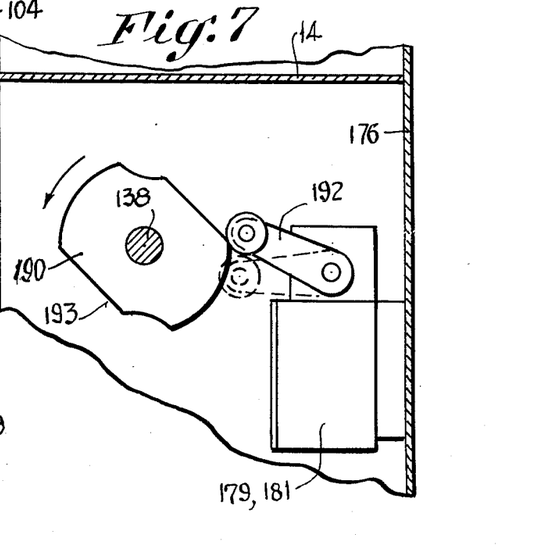
FIG. 7 is a section taken along line 7—7 of FIG. 1.

The operation of the counter will now be briefly described. Referring to FIG. 9, a main toggle switch 189 controls primary a.c. power to the counter 177, which in the present unit is known commercially as an Eagle Cycle Flex Counter, Type Hz 170 A6 (the terminal numbers on the drawing corresponding to this unit). Referring for the moment to FIG. 7 it is noted that the shaft 138 has a cam 190 which is positioned as shown for beginning a new spool 12. For this condition, the switch 179 (in FIG. 9) is closed and the switch 181 is open. These switches are ganged so that when either is open, the other is closed, and vice-versa. With the traverse mechanism 38 reciprocating, the counts are made by the switch 178, which closes once each time the plate 182 strikes its actuator roller 180. The counts are recorded in the counter 177 until the predetermined number has been reached, at which time terminals 9 and 10 of the counter are connected together by a switch 183 (in the counter) which connects the motor 162 (terminals 1 and 2) across the main supply line and causes it to turn the shaft 138 in the direction indicated in FIGS. 1 and 7. As the cam 190 rotates with the shaft through 90°, the lever 192 assumes the position indicated in dotted lines in FIG. 7 adjacent the cam flatted portion 193. For this position of the lever 192 the switch 179 opens and the switch 181 closes. Opening of the switch 179 has the effect of resetting the counter to start it again from zero; closing of the switch 181 temporarily maintains the power circuit to the motor by bypassing the counter switch 183 (since the counter, when reset, would immediately open the motor circuit). The shaft 138 and cam 190 undergo a net rotation of 180°, at which time the lever 192 again engages the cylindrical portion of the cam and assumes the position in FIG. 7 indicated by the solid line. This in turn closes the switch 179 and opens the switch 181 (the latter stopping the motor almost instantaneously). The counter is thus reset and ready to count the reciprocations once again.

As mentioned above, the switch 172 is a normally open limit switch, which closes momentarily to run the motor 162 for initial positioning of the abutments 134 and 136. As can be seen from FIG. 9, the switch 172 bypasses the counter circuitry by connecting one of the supply lines directly to terminal 1 of the motor 162. The motor 162 can also be employed to drive a potentiometer (not shown) through proper gearing in order to effect a control of the speed of the (d.c.) motor (not shown) which powers the spooling device through belt 20 of FIG. 1. The change in resistance between the terminal pair of the potentiometer could be employed in a control circuit (not shown) providing a variable d.c. output voltage for the field winding of the drive motor, in order to reduce the rate of rotation of the shaft 28 and the take-up spool 12. With such an arrangement, the wire feed in feet per minute from the master spool could be maintained constant. Without this arrangement, the take-up spool would run at a constant r.p.m., and the feed rate from the master spool would have to be adjustably increased as the wire on the take-up spool 12 increased the effective take-up spool diameter. Such adjustment of the wire feed rate from the master spool would be difficult and would probably provide less than satisfactory performance.

Figure 10:
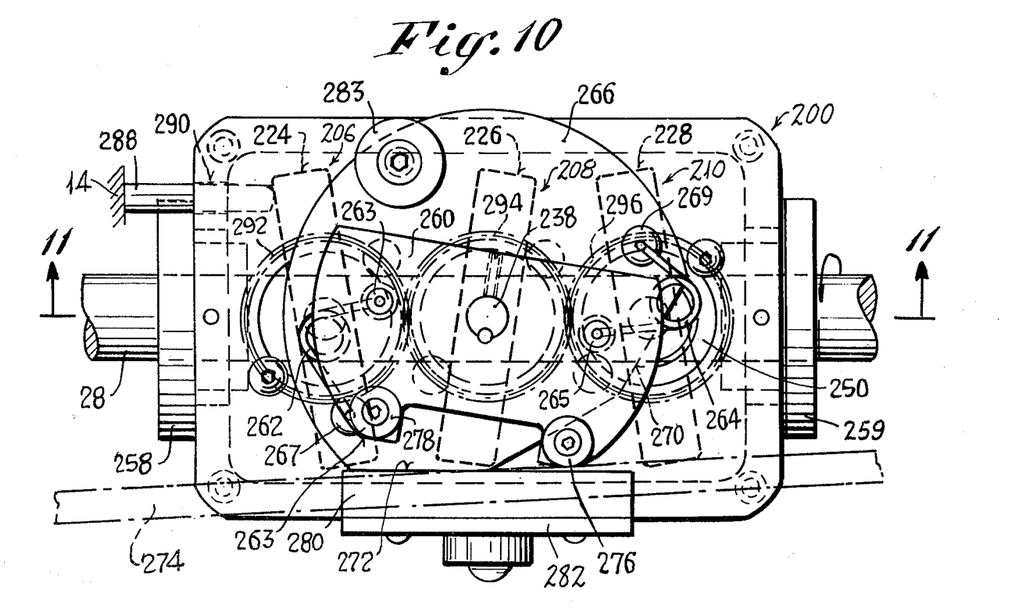
FIG. 10 is a top plan view of a modified traverse mechanism having variable pitch, constituting another embodiment of the invention.
Figure 11:
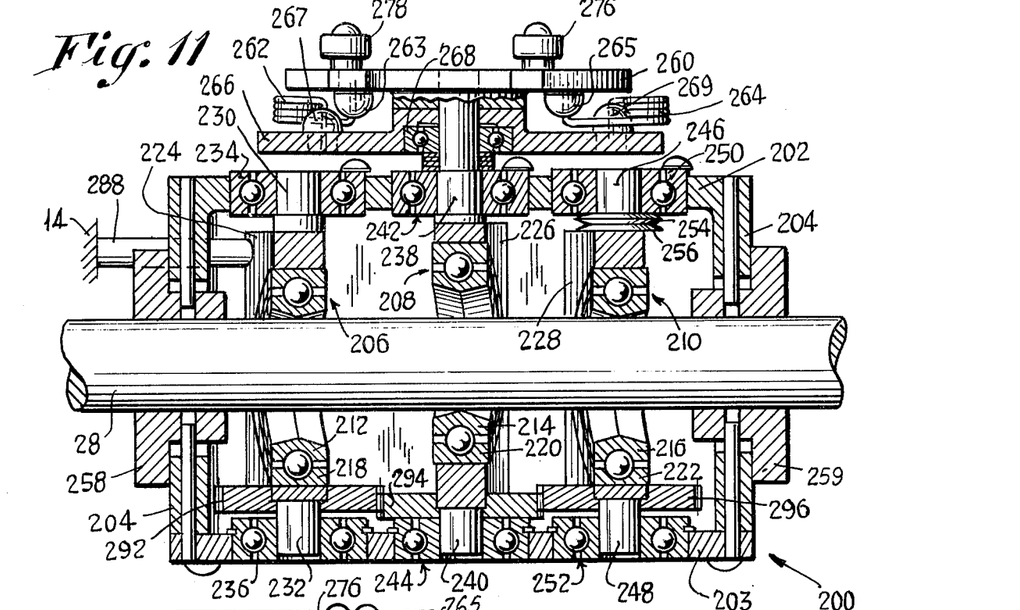
FIG. 11 is a section taken on line 11—11 of FIG. 10.
Figures 12, 13:
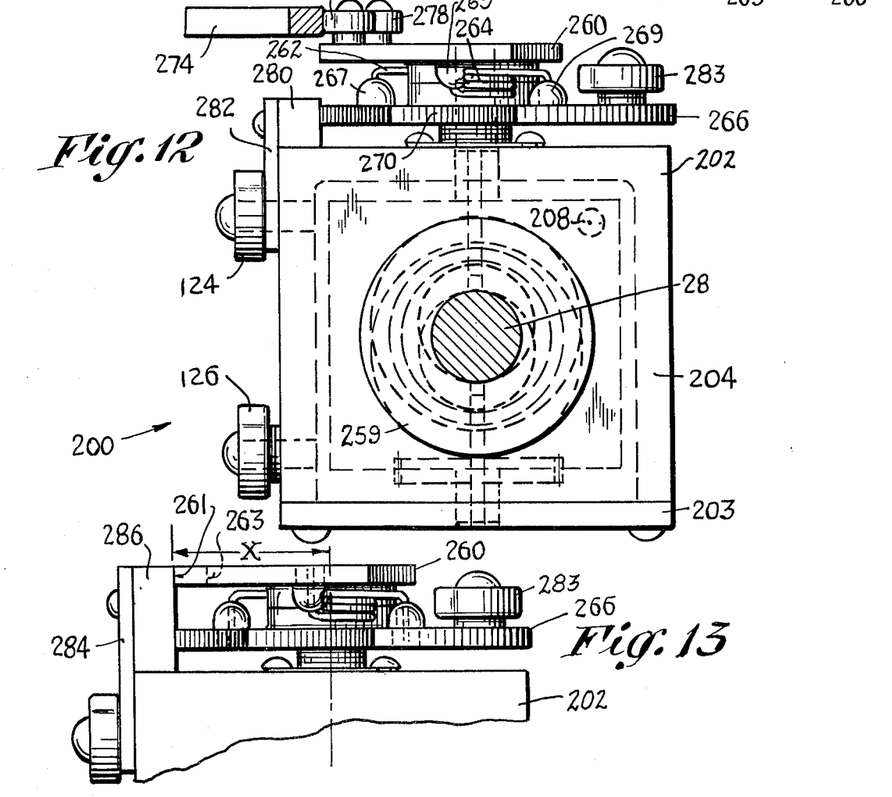
FIG. 12 is a right end elevational view of the traverse mechanism of FIGS. 10 and 11.
FIG. 13 is a fragmentary right end elevational view of a further modified traverse mechanism constituting yet another embodiment of the invention.

Yet another embodiment of the invention is illustrated in FIGS. 10–12, showing a modified traverse mechanism generally designated 200, which could be employed in place of the traverse mechanism 38 of FIG. 1, the mechanism 38 having been illustrated particularly in FIGS. 3-6 and discussed above. The mechanism 200 is adapted for engagement with the rotating shaft 28 of the spooling device 10 of FIGS. 1 and 2, to thereby undergo reciprocating and traversing movement in a path having a direction parallel to the shaft axis.

Referring to FIG. 11, the mechanism 200 comprises bases 203 and 202 of housing 204, and rollers 206, 208 and 210. The rollers 206-210 comprise annular bearing assemblages having inner races 212, 214 and 216 respectively and outer races 218, 220 and 222 respectively, the assemblages being disposed within the housing 204. It will be readily seen that the inner races 212–216 have a substantially larger diameter than that of the shaft 28, and thus engage the latter along limited peripheral areas. The rollers 206–210 are carried on mounting blocks 224, 226 and 228 which are swivel mounted on the base 202. The block 224 has mounting shafts 230, 232 which engage bearings 236, 234 carried on the base 203 and base 202, respectively. The mounting blocks, shafts and bearings thus constitute means mounting the roller on the base for turning movement about its axis and for swiveling movement about another axis. In a similar manner the block 226 is rotatably carried on the bases by means of shafts 238, 240, the shaft 238 extending through the wall of the base 202. The shafts engage bearings 244 and 242 carried on the base 203 and base 202, respectively. Similarly, the block 228 is rotatably mounted by means of shafts 246 and 248 engaging bearings 250, 252 on the bases 202 and 203, respectively.

Referring again to FIG. 11, the roller assemblage 210 is biased into engagement with the shaft 28 by means of back-to-back spring washers 254, 256. The housing 204 carries slide bearings 258, 259 which enable limited self-alignment of the traverse mechanism 200 with respect to the shaft 28. Thus the slide bearings 258 and 259 and spring washers 254, 256 operate in such a way as to maintain continuous engagement with the shaft 28 of all three bearing assemblages 206, 208 and 210.

Referring particularly to FIGS. 10 and 11, there is provided a yieldable biasing means urging the bearing assemblage 208 to either one of two oppositely disposed extreme positions, one position being that illustrated in FIG. 10 and the other (not shown) being analogous to that illustrated in FIG. 4 in connection with the first mentioned embodiment. The yieldable biasing means comprises an arm 260 rigidly carried on the shaft 238, and a pair of torsion coil springs 262, 264 each having one end pivotally connected to the arm 260 by means of threaded bushings 263, 265, respectively which are received in tapped holes in the arm. The free ends of the torsion springs are connected to a second arm 266 by means of threaded bushings 267, 269 which are received in tapped holes in the arm 266, the second arm 266 being carried on a bearing 268 concentric with the shaft 238. It can be seen that the arm 266 is capable of undergoing limited turning movement with respect to the shaft.

The arm 260 is keyed to the shaft 238 and is thus rigid with respect to the bearing assemblage 208. The arm 260 and bearing assemblage can thus undergo simultaneous swiveling movement about the axis of the shaft 238. The second arm 266 can also undergo limited rotation between two extreme positions, the two positions being defined, respectively by the engagement of the flatted portions 270 and 272 (FIG. 10) of the arm with a rubber stop 280 (FIG. 12) mounted on a stop-plate 282 carried on the base 202. It will be understood that the torsion springs are so arranged that when the angle between their ends is less than 90°, the force exerted by the spring is in such a direction as to increase the angle toward 90°. Thus, the arm 260 and the arm 266 are urged toward oppositely disposed extreme positions on opposite sides of a dead center position. The arm 266 has an actuator roller 283 to effect turning movement thereof when engaged by suitable abutment means. It will be understood that the above arrangement gives rise to an essentially instantaneous, snap swiveling movement of the arm 260 (and bearing assemblages 206, 208 and 210) from one extreme position to an oppositely disposed extreme position in response to the relatively slow or gradual turning movement of the arm 266 (due to the engagement by a suitable abutment of the roller 283 as the traverse moves along the shaft 28). The swiveling movement of the arms 260 and 266 is analogous to that explained above in connection with the embodiment of FIGS. 3–6.

In accordance with the present invention there is further provided means responsive to traversing movement of the mechanism and operable throughout a substantial portion of the path of travel thereof for effecting gradual swiveling movement of the roller 208 (and rollers 206, 210) to thereby alter the speed of the traverse along its path of travel in accordance with a predetermined pattern.

Referring to FIGS. 10 and 12, this means comprises a stationary control bar 274 carried by the frame on which the shaft 28 is rotatably mounted, and rollers 276, 278 carried by the arm 260. The arm 260 and rollers 276 and 278 constitute means cooperable with the control bar and connected with the roller mounting means for swiveling the roller 208. It can be seen that the control bar 274 is disposed at a slight angle with respect to the axis of the shaft 28, and is laterally displaced therefrom such that either of the rollers 276 and 278 will engage the bar. It will be understood that for the relative positions of the arms 260 and 266 as shown in FIG. 10, the roller 276 will be biased into engagement with the control bar 274 by the torsion springs 262, 264 (when the traverse mechanism 200 has reversed direction and is traveling toward the left in FIG. 10 in response to rotation of the shaft in the direction indicated). As the traverse mechanism 200 continues traveling toward the left, the angular position of the arm 260 (and hence rollers 206, 208, 210) will gradually and continuously shift, the roller 208 shifting clockwise in FIG. 10. This has the desired effect of increasing the rate at which the traverse moves when it is near the central portion of its reciprocating cycle, even though the rate of rotation of the shaft 28 is constant. Thus, by the above arrangement, the pitch of the rollers 206–210 is automatically adjusted at a controlled rate (depending on the angle which the control bar makes with the axis of the shaft 28) which, for a given rate of shaft rotation, will cause the traverse to move more slowly at one end of its reciprocating cycle. In the case where the traverse mechanism is employed to deposit wire on a spool, by such an arrangement there is achieved a tapered wind, with more wire being deposited on the spool adjacent the vicinity of the reduced speed of the traverse. It can be readily seen that when the traverse reaches its left extreme position, the engagement of the roller 283 by a fixed abutment (such as 134 in FIG. 1) will cause clockwise shifting (in FIG. 10) of arm 266, and shortly thereafter an instantaneous counterclockwise shifting of arm 260 (FIG. 10) and roller 208 such that the roller 278 of arm 260 now engages the control bar 274, wherein the latter controllably adjusts the pitch of the rollers 206–210 as the traverse mechanism begins to travel toward the right, thereby providing a variable rate of traversal in both directions.

It can be seen that, in place of the linear control bar 274, a control bar having a V-configuration could be employed, with the apex of the V lying midway between ends of the path of reciprocation of the traverse. By such an arrangement, for a given rate of shaft rotation, the speed of the traverse would be reduced at both ends of reciprocating cycle with respect to that occurring midway in the cycle, which in the case of a spooling mechanism, would have the effect of causing more wire to be deposited on a take-up spool in the vicinity of the spool ends and less to be deposited adjacent the center of the spool.

FIG. 13 illustrates another embodiment of the invention, which is similar to that of FIGS. 10–12 except that the control bar 274 has been eliminated, and the stop plate or rigid backing member 284 and rubber bar 286 have been extended so as to be engageable with both arms 260 and 266. The arm 260 has substantial abutment shoulders 261 and 263. The rubber bar thus constitutes a resilient shoulder fixed on the base and cooperable with the abutment shoulders 261, 263 of the arm 260. The advantage of this arrangement is one of extreme simplicity, since a single stop is used to determine the end or limit rotary positions of both arms. It will be readily seen in FIG. 13, that by varying the dimension labelled X of arm 260, such as by machining the arm, the end or limit swivel positions of the arm 260 (and hence the rollers 206, 208 and 210) can be controllably adjusted. The pitch of these rollers can thus be chosen to suit particular requirements. The same effect can of course be achieved by varying the thickness of the rubber stop 286, in order to attain a particular pitch of the rollers 206, 208 and 210. The arm 260, rubber stop 286 and stop plate 284 thus constitute cooperable stop means on the base 202 and on the roller mounting means for limiting swiveling movement of the roller to oppositely disposed extreme positions.

In accordance with the present invention there is further provided an adjustable abutment member cooperable with the roller mounting means for effecting gradual shifting of the same and of the roller 208 (through roller 206) at a predetermined point in the path of travel of the roller 208 along the shaft 28, thereby to halt the traversing movement of the roller (and mechanism) at a predetermined point, comprising a pin 288 (FIGS. 10, 11) carried by the frame 14 of the spooling device. The pin is receivable in a recess 290 of the housing 204 and is in line with the roller block 224 so as to be engageable with the latter when the traverse moves toward the left. Referring to FIG. 10, and assuming the traverse 200 is moving toward the left, at such time as the stationary pin 228 engages the block 224, further movement of the traverse toward the left will cause the block 224 to shift clockwise in FIG. 10 until the roller 224 and roller blocks 226, 228 are perpendicular to the shaft 28. Under such circumstances, further movement along the shaft will cease, even though the latter continues to rotate. Thus, the traverse can be "stalled" at a predetermined point as determined by the location of the pin 288. Such an arrangement is very useful when it is desired to start feeding a cable onto a spool at a given point or position thereon.

Further in accordance with the present invention, referring to FIG. 11, there are provided means connecting all of the rollers 206, 208 and 210 for effecting simultaneous swiveling of the rollers 206 and 210 in response to swiveling movement of the roller 208, this means comprising spur gears 292, 294 and 296, carried by and rigid with the rollers 206, 208 and 210 respectively. It will be readily seen that by this arrangement, for a given swiveling movement of roller 208, the rollers 206 and 210 swivel in the opposite direction, such that all the rollers tend to aid one another in driving the traverse in one direction at a time for a given sense of shaft rotation.

From the above it can be seen that I have provided a novel and improved automatic traverse mechanism and several modified forms thereof, for use with a spooling device, the mechanisms being simple in construction, reliable in operation, and enabling virtually complete automation of the process of transferring wire from master or large supply spools to smaller take-up spools, thus representing a distinct advance and improvement in this particular art.

Variations and modifications are possible without departing from the spirit of the invention.

I claim:

1. A reversing traverse mechanism for engagement with a rotating shaft, comprising in combination:
   a. a base,
   b. a roller,
   c. means mounting the roller on the base for turning movement about its axis and for swiveling movement about another axis, and
   d. operating means for automatically instantaneously swiveling the roller from one extreme angular position to an opposite extreme angular position in response to traversing movement of said base and roller along the shaft, said operating means including yieldable means comprising a metal spring for biasing said roller to either of said two oppositely-disposed extreme angular positions and including an arm connected with said roller mounting means and pivotally movable with the roller about said other axis, and a second arm pivotally mounted on the base for movement about said other axis, said spring being connected between said arms and tending to bias them from dead-center positions toward oppositely-disposed extreme rotary positions with respect to one another.

2. A mechanism as in claim 1, in combination with:
   a. a smooth-surfaced rotating shaft,
   b. said roller comprising an annulus through which the shaft passes, the inner surface of said annulus engaging said shaft along a limited area of its periphery.

3. A mechanism as in claim 1, in combination with:
   a. a smooth-surfaced rotating shaft,
   b. said roller comprising an annular bearing assemblage having an inner race and an outer race, said inner race defining an opening in the assemblage,
   c. said shaft passing through said opening,
   d. said inner race being of larger diameter than said shaft and engaging the latter along a limited peripheral area,
   e. said outer race constituting a part of said roller mounting means.

4. A mechanism as in claim 2, and further including:
   a. spring means biasing said roller into engagement with said shaft.

5. A mechanism as in claim 1, and further including:
   a. additional rollers,
   b. means mounting said additional rollers on the base for turning movement about their respective axes, and for swiveling movement about other axes, respectively, and
   c. linkage means connecting all of said rollers for effecting simultaneous swiveling of said additional rollers in response to swiveling of said first-mentioned roller.

6. A mechanism as in claim 5, wherein:
   a. said additional rollers are disposed on opposite sides of said first-mentioned roller and engage the shaft at points thereon along a line substantially diametrically opposite the point engaged by said first-mentioned roller, whereby the net force of the first mentioned roller on the lateral surface of the shaft opposes the oppositely directed forces of the additional rollers on the shaft,
   b. the swiveling of said first-mentioned roller being in a direction opposite to that of said additional rollers, such that all of the rollers tend to move the base in the same direction along the axis of the shaft as the latter rotates.

7. A mechanism as in claim 6, wherein:
   a. said linkage means comprises a slide plate carried on said base, and
   b. pins carried by said roller mounting means and engageable with the slide plate.

8. A mechanism as in claim 1, and further including:
   a. a housing connected with said base and having openings to receive the shaft, and
   b. end bearings carried by the housing in the openings thereof, engageable with the shaft to rotatably carry the same,
   c. said roller being enclosed in said housing.

9. A reversing traverse mechanism for engagement with a rotating shaft, comprising in combination:
   a. a base,
   b. a roller,
   c. means mounting the roller on the base for turning movement about its axis and for swiveling movement about another axis to either of two extreme positions, and
   d. operating means for automatically instantaneously swiveling the roller from one extreme angular position to an opposite extreme angular position in response to traversing movement of said base and roller along the shaft, said operating means including yieldable means comprising a metal spring for biasing said roller to either of said two oppositely-disposed extreme angular positions, including an arm connected with said roller and adapted to swivel the latter, said spring being connected with said arm for urging the roller from a dead-center position to either of its extreme positions, and further including a reversing member movable on the base and connected with said spring for effecting actuation of said arm.

10. A mechanism as in claim 9, wherein:
    a. said reversing member is rotatably mounted on the base, and
    b. a stationary abutment cooperable with said reversing member for automatically actuating the latter and substantially instantaneously shifting said arm and roller from one extreme position to the other in response to traversing movement of the base and roller along the shaft.

11. A mechanism as in claim 10, wherein:
   a. said operating means further includes a second stationary abutment cooperable with said reversing member to reversely move the same and thereby reverse the movement of the base and roller so as to enable these to undergo reciprocating movement with respect to the shaft.

12. A mechanism as in claim 10, wherein:
   a. the spring comprises a coil having laterally projecting ends connected respectively to said reversing member and arm.

13. A mechanism as in claim 11, and further including:
   a. a counter device for counting the number of reverse traverse movements of said base,
   b. said abutments being adjustable to different positions, and
   c. means controlled by said counter device for automatically shifting said abutments further apart after a predetermined number of reverse traversing movements has been counted by said counter device.

14. A mechanism as in claim 13, and further including:
   a. manually operable means for adjusting said abutments to different positions,
   b. means interconnecting said abutments for simultaneous movement in opposite directions either toward or away from one another,
   c. electrically powered means connected with said interconnecting means to actuate the latter, and
   d. a limit switch disposed on the frame and electrically connected with said powered means,
   e. said limit switch being engageable by one abutment when the two abutments are manually adjusted so as to approach one another, whereby engagement of the limit switch with said one abutment momentarily actuates said electrically powered means in a direction opposite to that of the manual adjustment, thereby to indicate that a predetermined position of the abutment has been reached.

15. A mechanism as in claim 13, and further including:
   a. means interconnecting said abutments for simultaneous movements in opposite directions either toward or away from one another,
   b. said interconnecting means comprising a rotatable threaded shaft,
   c. a cam disposed on said shaft,
   d. a switch connected with said electrically powered means and operable by said cam to de-energize said powered means after a predetermined partial revolution of said threaded shaft,
   e. said counter constituting a control of said electrically powered means.

16. A mechanism as in claim 1, and further including:
   a. additional rollers,
   b. means mounting said additional rollers on the base for turning movement about their respective axes, and for swiveling movement about other axes respectively, and
   c. means connecting all of said rollers for effecting simultaneous swiveling of said additional rollers in response to swiveling of said first-mentioned roller.

17. A mechanism as in claim 16, wherein:
   a. said means connecting all of said rollers comprises gears carried respectively by said rollers.

18. A mechanism as in claim 1, and further including:
   a. a cooperable stop means on said base and roller mounting means, for limiting swiveling movement of said roller to oppositely disposed extreme positions.

19. A mechanism as in claim 18, wherein:
   a. said cooperable stop means comprises said arm connected with the roller mounting means, said arm having substantial abutment shoulders, and further comprises a resilient shoulder fixed on said base and cooperable with said abutment shoulders of the arm.

20. A mechanism as in claim 19, wherein:
   a. the resilient shoulders comprise a rubber bar, and
   b. said base having a rigid backing member engaged with said rubber bar to limit the yielding action of the latter.

21. A mechanism as in claim 1, and further including:
   a. an adjustable abutment member cooperable with said roller mounting means for effecting gradual swiveling of the same and said roller at a predetermined point in the path of travel of the roller along the shaft, thereby to halt the traversing movement of said roller at said predetermined point.

22. A mechanism as in claim 1, and further including:
   a. means responsive to traversing movement of the mechanism and operable throughout a substantial portion of travel thereof for effecting a gradual swiveling movement of the roller to thereby alter the speed of traverse along its path of travel in accordance with a predetermined pattern.

23. A mechanism as in claim 22, wherein:
   a. said means for effecting gradual swiveling movement comprises a stationary control bar, and
   b. means cooperable with said control bar and connected with said roller mounting means for swiveling the roller.

* * * * *